United States Patent
Thomsen et al.

(10) Patent No.: US 11,421,652 B2
(45) Date of Patent: Aug. 23, 2022

(54) ROTOR CONTROL SYSTEM FOR REDUCING STRUCTURAL VIBRATIONS BASED ON M-BLADE TRANSFORMATION

(71) Applicant: VESTAS WIND SYSTEMS A/S, Aarhus N (DK)

(72) Inventors: Jesper Sandberg Thomsen, Hadsten (DK); Keld Hammerum, Hadsten (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 65 days.

(21) Appl. No.: 17/054,154

(22) PCT Filed: May 7, 2019

(86) PCT No.: PCT/DK2019/050138
§ 371 (c)(1),
(2) Date: Nov. 9, 2020

(87) PCT Pub. No.: WO2019/214786
PCT Pub. Date: Nov. 14, 2019

(65) Prior Publication Data
US 2021/0231102 A1    Jul. 29, 2021

(30) Foreign Application Priority Data
May 9, 2018 (DK) .................. PA 2018 70286

(51) Int. Cl.
*F03D 7/02* (2006.01)

(52) U.S. Cl.
CPC ........ *F03D 7/0224* (2013.01); *F03D 7/0296* (2013.01); *F05B 2220/30* (2013.01); *F05B 2270/334* (2013.01)

(58) Field of Classification Search
None
See application file for complete search history.

(56) References Cited

U.S. PATENT DOCUMENTS

2011/0229300 A1    9/2011    Kanev et al.

FOREIGN PATENT DOCUMENTS

| EP | 2447527 A1 | 5/2012 |
|---|---|---|
| EP | 2693049 A2 | 2/2014 |
| WO | 2017144061 A1 | 8/2017 |
| WO | 2018210390 A1 | 11/2018 |
| WO | 2019214786 A1 | 11/2019 |

OTHER PUBLICATIONS

Patent Cooperation Treaty International Search Report for Application No. PCT/DK2019/050138 dated Jul. 29, 2019.
PCT Written Opinion of the International Searching Authority for Application No. PCT/DK2019/050138 dated Jul. 29, 2019.
Danish Patent and Trademark Office Examination for Application No. PA 2018 70286 dated Nov. 12, 2018.

*Primary Examiner* — Juan G Flores
(74) *Attorney, Agent, or Firm* — Patterson + Sheridan, LLP

(57) ABSTRACT

The present invention relates to a rotor control system for actuating pitch of pitch adjustable rotor blades in order to reduce vibrations of a wind turbine element, e.g. tower vibrations. A pitch modification signal is determined which is based on an m-blade coordinate transformation, such as the Coleman transformation. The m-blade coordinate transformation taking as input a first signal and a second signal. The second signal is determined by filtering the first signal with a signal filter with a quadrature phase shift filter phase response.

18 Claims, 5 Drawing Sheets

ROTOR CONTROL SYSTEM FOR REDUCING STRUCTURAL VIBRATIONS BASED ON M-BLADE TRANSFORMATION

FIELD OF THE INVENTION

The present invention relates to control of a wind turbine to reduce structural vibrations.

BACKGROUND OF THE INVENTION

Wind turbines as known in the art comprises a wind turbine tower supporting a nacelle and a rotor with a number of pitch-adjustable rotor blades.

A wind turbine is prone to vibrations since it comprises a large mass placed at the end of a slender tower. These vibrations include nacelle movement in the lateral direction, in the fore-aft direction as well as in the torsional direction of the nacelle. It is known in the art that the vibrations can be damped by actively pitching of the blades and/or adjusting the generator torque to generate counter forces to reduce the nacelle movement.

In this regard, a collective adjustment of the blade pitch, where all rotor blades are adjusted by the same pitch angle, can be used to counteract oscillations in the fore-aft direction. This is accomplished by modifying the thrust force. For lateral vibrations, an individual blade pitch adjustment as well as generator torque adjustments may be used to counteract a lateral vibration of the tower. The individual blade pitch adjustment provides individual pitch angle settings for each rotor blade to generate a resulting lateral force, and/or to suppress an existing disturbance from e.g. a pitch misalignment. The generator torque adjustment generates a generator torque induced lateral force.

WO 2017/144061 discloses a method for damping an oscillation of a tower of a wind turbine by pitching each rotor blade individually according to tower damping pitch control signals, wherein each tower damping pitch control signal comprises periodic components, including a first periodic component, and where a second periodic component has been reduced or removed.

It is a complicated process, based on a given vibrational motion, to determine exactly how the pitch actuators should be controlled, and while e.g. WO 2017/144061 discloses a given method, there is still a need in the art for providing further methods.

SUMMARY OF THE INVENTION

It would be advantageous to achieve an improved manner of reducing vibrations in a wind turbine. In this regard it would be desirable to provide a control system which can instruct a pitch actuator in a manner that assists in reducing vibrations of elements of the wind turbine. In would be particularly advantageous to provide an improved manner of vibration reduction which reduces a fatigue impact on the pitch actuator as compared to methods of the prior art.

Accordingly, in a first aspect, there is provided a rotor control system for actuating pitch of pitch adjustable rotor blades of a wind turbine comprising a tower, the rotor control system comprises a pitch actuating unit for determining a pitch modification signal to be applied to a pitch actuator for actuating the pitch of the pitch adjustable rotor blades based on a pitch actuation signal;

wherein the pitch modification signal is based on an m-blade coordinate transformation, the m-blade coordinate transformation taking as input a first signal and a second signal; and wherein the second signal is determined by filtering the first signal with a signal filter with a quadrature phase shift filter phase response.

A rotor control system for actuating pitch of pitch adjustable rotor blades is provided which is capable of reducing structural vibrations of elements of the turbine, such as tower vibrations. The invention is particularly, but not exclusively, advantageous for providing a rotor control system which is capable of reducing structural vibrations of elements of the turbine with a reduced pitching activity as compared to known methods.

In the present invention, the pitch modification signal is based on an m-blade coordinate transformation based on an input signal. An m-blade coordinate transformation transforms a signal between coordinate reference frames. As an example the m-blade coordinate transformation may transform a signal obtained in a stationary reference frame to a rotating frame. An effect of applying an m-blade coordinate transformation is that frequency content at a given frequency will split into two frequency contributions, one centred at plus, and one centred at minus, the frequency of the rotational frequency. This is a known effect, and as a result, in order to reduce vibrations at a given frequency, the actuator will be actuated in two frequency areas, one area on each side of the vibration frequency.

The inventors of the present invention have realized that by determining the second signal by filtering the first signal with a signal filter with a quadrature phase shift filter phase response, then the pitch actuation signal is altered in a manner where the actuation at one of the two actuating frequencies is reduced or even removed while still obtaining a vibration reducing effect. In this way the actuator's pitching activity can be reduced, and thereby reduce the fatigue exposure on the pitching actuators. The actuator pitching activity may also be tuned in view of specific frequency exiting modes in the turbine, or in a trade-off between pitching activity and resulting damping effect of a given turbine structure.

The m-blade coordinate transformation, taking as input two input signals: a first signal and a second signal, the input signals being obtained in a stationary reference frame. The m-blade coordinate transformation transforms the signal into a rotational frame, where they are applied to the pitch actuator.

In an embodiment the m-blade coordinate transformation is a Coleman transformation, however other transformation may also fall in the category of m-blade coordinate transformations, hereunder so-called d-q transformation and Park transformation or similar transformations. It is within the abilities of the skilled person to determine an alternative transformation which may not strictly be a Coleman transformation, but which operates in an equivalent manner.

In general the m-blade transformation is a transformation between a first coordinate frame and a second coordinate frame, and the m-blade transformation takes a signal from the first frame to the second frame, whereas an inverse m-blade transformation takes the signal from the second frame to the first frame. In this regard signals may be measured, modified and actuated in same or different coordinate frames. In an embodiment the m-blade coordinate transformation takes a signal comprising two components measured in a stationary frame and transforms the signals to a three component in a rotating frame. Hereby signal components (the pitch modification signals) are provided which can be imposed onto the three pitch actuators. This embodiment is applicable to a three-bladed wind turbine. For a turbine with a different number of blades, the m-blade transformations need to be adjusted accordingly.

The second signal is determined by filtering the first signal with a signal filter with a quadrature phase shift filter phase response. A quadrature phase shift filter may also be referred to as a 90° phase-shift filter, however it is to be understood, that a 90° phase-shift is not always obtained as the exact phase-shift may depend on the conditions under which the filter is applied. However, in ideal situations a quadrature phase shift filter shifts the filtered signal by 90°. In general the quadrature phase shift filter may be understood as a filter with an ideal phase shift of 90° but which under working conditions, may obtain a phase shift which is not exactly 90°, but can be approximately 90°, such as 90°±15°.

In an embodiment the signal filter is a leaky integrator. In general other types of filters with a quadrature phase shift may also be used, examples include a general first order low pass filter and a differential filter.

In an embodiment, the first signal is a tower motion signal reflecting a tower motion in a selected motional mode. A selected motional mode may include linear motion, hereunder sidewards vibrational motion, also referred to as lateral vibrational motion. A selected motional mode may also include angular motion, hereunder torsional vibrational motion. In an embodiment the tower motion is reflected by a tower velocity. However, also position or acceleration may be used, both for linear motion and angular motion. Other vibrational motion besides tower motion may be targeted, hereunder undesired blade vibrations, e.g. edgewise blade vibrations.

In general, the pitch modification signal may be a signal to reduce vibrations of an element of the wind turbine, in particular the tower. The pitch modification is generally a signal to reduce vibrations of an element, this may be a signal which results in the generation of a force, such as a damping force, that is directed opposite the direction of movement of the vibration of the element. The magnitude may be implemented to be proportional to the speed of the movement. The element may in embodiments be the tower of the wind turbine system, however in general the element may be an element fixed to the tower, or in a fixed relationship with the tower. Examples of such elements are the drive train and the nacelle frame.

In a further aspect, the invention relates to a wind turbine comprising the rotor control system according the first aspect. In yet further aspects, the invention relates to a method actuating pitch of pitch adjustable rotor blades of a wind turbine and to a computer program product. The computer program product may be provided on a computer readable storage medium or being downloadable from a communication network. The computer program product comprises instructions to cause a data processing system, e.g. in the form of a controller, to carry out the instruction when loaded onto a data processing system.

In general, the rotor control system may be implemented on a unit or collection of functional units which comprises one or more processors, input/output interface(s) and a memory capable of storing instructions can be executed by a processor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

FIG. 1 illustrates a wind turbine and vibrational modes of the wind turbine.

Figure 1A:
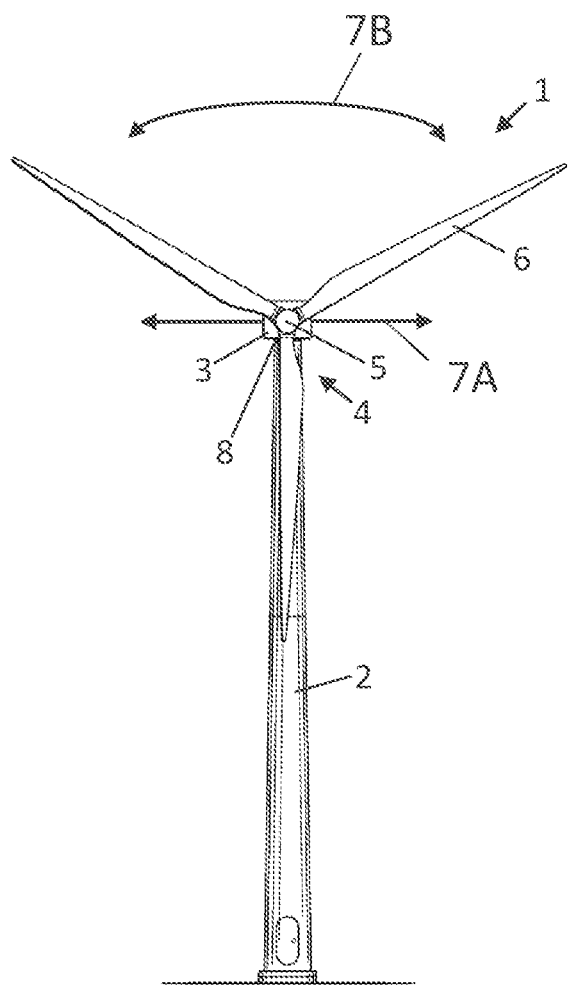
FIG. 1 illustrates a wind turbine and vibrational modes of the wind turbine.

FIG. 1A illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint.

Figure 1B:
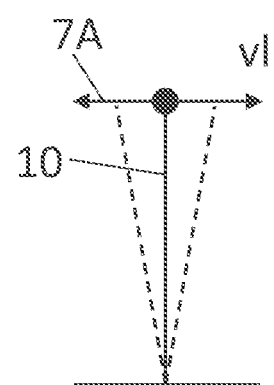
Figure 1C:
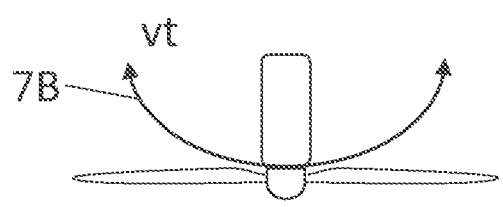

The turbine may vibrate in the lateral direction 7A, that is in a direction of the rotor plane. Such vibration is also sometimes referred to as side-side vibration or sidewards vibration. Aspects of lateral vibration is schematically illustrated in FIG. 1B. In this figure, the turbine 10 is schematically illustrated by a tower structure fixed in one end and provided with a mass at the free end. When the tower top vibrates in the lateral direction 7A, the velocity, vl, characteristic of the nacelle velocity varies between two maxima defined by the lateral movement during the vibration. The velocity, vl, may be a velocity representative of the nacelle motion in the lateral direction, the velocity may, e.g., be a centre-of-mass velocity of the nacelle, the velocity of the relevant sensor, or velocity of other fix-points representing the movement of the nacelle in the lateral direction. In addition to the lateral vibration, also torsional vibration along the torsional direction 7B is illustrated in FIG. 1C. In this regard torsional direction should be understood as movement along a path defined by an arc sector or circle sector as shown. When the tower top vibrates in the torsional direction 7B, the velocity, vt, characteristic of the nacelle movement in the torsional direction, varies between two maxima defined by the maximum tower twist during the vibration. In an embodiment using an accelerometer 8 or gyroscope 8 to determine the nacelle movement, the accelerometer/gyroscope should be properly placed, such as at one end of the nacelle. In this regard, it may not be necessary to directly detecting the movement along the torsional direction, instead also indirect detection of the movement may be used, as long as the indirect movement correlates with the torsional movement. This may e.g. be obtained by an accelerometer which detects movement in the lateral direction, in combination with further information to determine that the movement is related to torsional vibration. Such further information may be the frequency of the vibration.

Figure 2:
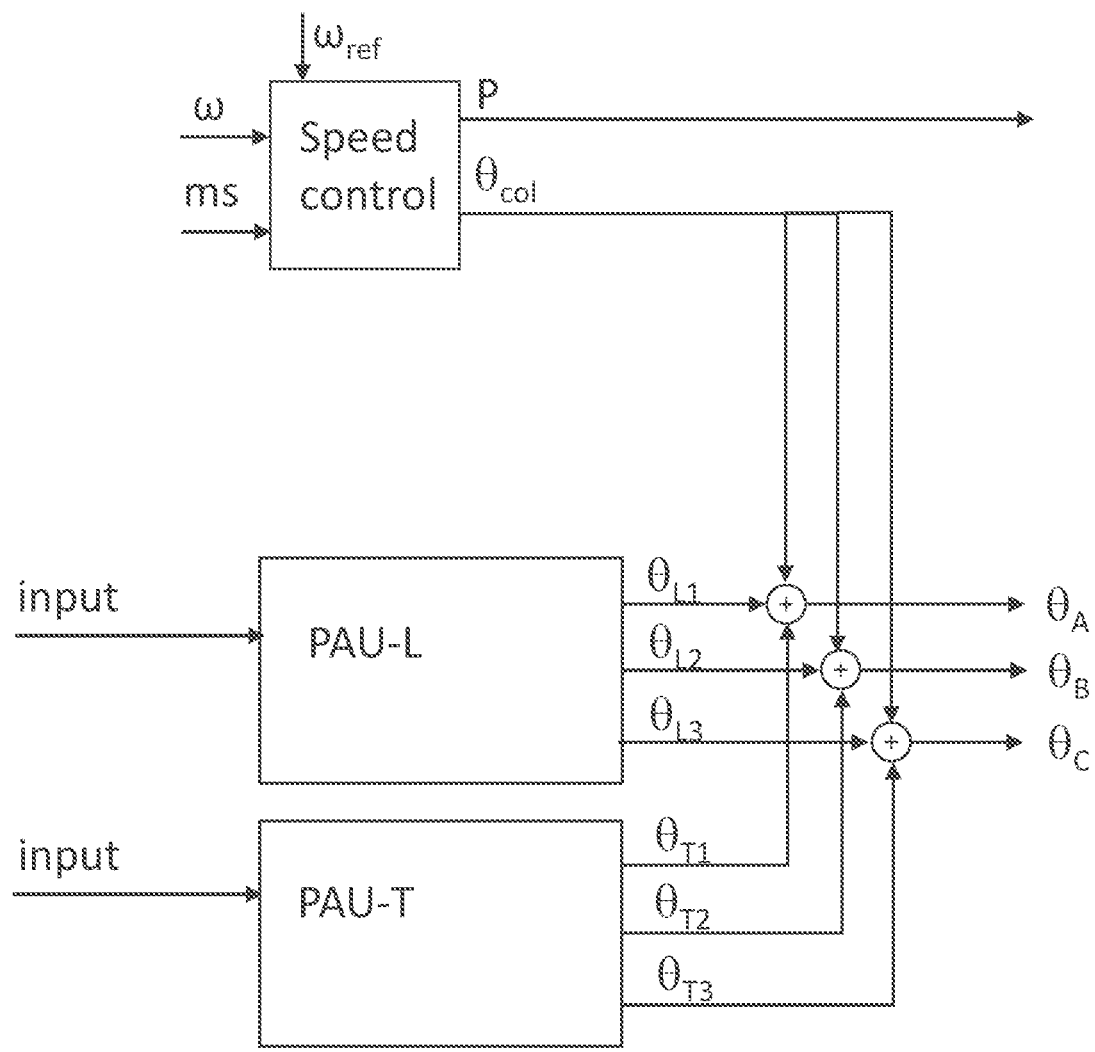
FIG. 2 is a diagram schematically illustrating an embodiment of a feedback speed controller.

FIG. 2 is a diagram schematically illustrating an embodiment of a feedback speed controller implemented to determine individual pitch actuation signals capable of reducing nacelle vibration. In the illustrated implementation, the speed controller minimizes a speed error ($\omega - \omega_{ref}$) between the actual rotor speed, $\omega$, and a reference rotor speed, $\omega_{ref}$, in order to output a requested power P (in the form of a power setpoint) and a collective pitch reference, $\theta_{col}$. The collective pitch reference as determined by the speed controller, in view of the rotor speed, may also take further sensor values into account, this is referred to in FIG. 2 as a measurement set, ms, being input into the speed controller. The feedback speed controller may be implemented by a PI, PID or similar control schemes. In an embodiment, the speed controller may alternatively be a model predictive controller which based on minimizing a cost function is arranged to determine the collective pitch reference and/or the power reference.

FIG. 2 further illustrates two vibration reducing control blocks or pitch actuation units. One unit is illustrated which shows a pitch actuating unit for reducing lateral tower vibrations (PAU-L).

Figure 3:
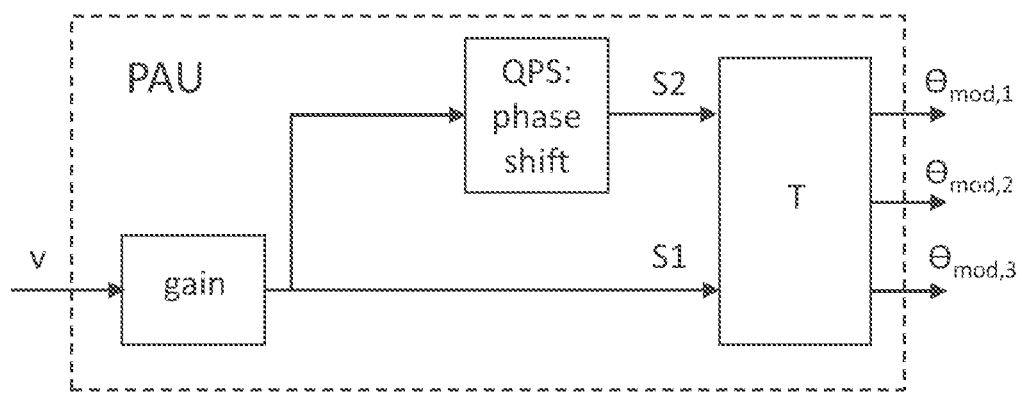
FIGS. 3 and 4 schematically illustrate embodiments of a pitch actuation unit (PAU)

In the lateral tower vibration pitch actuating unit pitch modification signals ($\theta_{L1}$, $\theta_{L2}$, $\theta_{L3}$) are being determined based on input signal(s). An embodiment of the implementation of the pitch actuation unit (PAU) is illustrated in FIG. 3.

The PAU-L control unit determines pitch modification signals for each rotor blade which are superimposed onto the collective pitch reference to provide resulting pitch modification signals ($\theta_A$, $\theta_B$, $\theta_C$) that can be applied to the pitch actuators of the rotor blades individually, and thereby reducing lateral tower vibrations.

In the embodiment shown in FIG. 2, a collective pitch reference for the pitch-adjustable rotor blades is being determined based on a rotor speed and a resulting pitch modification signal is being applied to the pitch-adjustable rotor blades. The resulting pitch modification signal being applied to the pitch-adjustable rotor blades individually, and for each individual blade being based on a combined signal of the collective pitch reference and the individual pitch modification signals. In an embodiment, the individual pitch modification signal is being applied in a cyclic manner.

As an addition or as an alternative, also the torsional tower vibration may also be reduced by using the pitch as actuator (PAU-T), where pitch actuation signals for reducing torsion tower vibrations is being determined in a corresponding manner as for the lateral tower vibration reduction.

In the pitch actuation unit for reducing torsional vibrations (PAU-T), the control unit determines pitch modification signals ($\theta_{T1}$, $\theta_{T2}$, $\theta_{T3}$) for each of the blades so that resulting pitch signals ($\theta_A$, $\theta_B$, $\theta_C$) can be applied to the pitch-adjustable rotor blades individually.

The pitch actuation unit uses an input signal of the vibrational motion and determines pitch modification signals which when properly actuated generates a counter force or torque in the direction of the movement of the nacelle, and thereby determine a signal for reducing a vibration of the element in the form of the tower of the wind turbine.

Tower vibrations occur in a stationary reference frame, and the signal representing the vibrational motion is obtained in the stationary reference frame. The pitch signals which are applied to reduce the vibration need however to be applied in the rotating reference frame of the rotor. The stationary reference frame may be the nacelle reference frame, i.e. the nacelle coordinate system. While the stationary reference frame may be a ground stationary reference frame, the stationary frame need not be a ground fixed frame, but a frame which is stationary with respect to a given turbine element, such as the nacelle.

To properly apply the pitch modification signals an m-blade coordinate transformation is applied.

In an example embodiment, the m-blade coordinate transformation is the Coleman transformation.

The Coleman transformation can be written in the following (compact) form where $\theta_k$ is the pitch offset angle for each blade, i.e. the pitch modification signal, $\theta_a$ is the tilt moment modulation signal, and $\theta_b$ is the yaw moment modulation signal. It is noted that the tilt moment modulation signal corresponds to sideways force. $\Omega$ is the rotational speed.

$$\theta_k = \theta_a \cos\left(\Omega t + \frac{2\pi}{3}(k-1)\right) + \theta_b \sin\left(\Omega t + \frac{2\pi}{3}(k-1)\right), k = 1, 2, 3$$

or $$\theta_k = a(t) + b(t), k = 1, 2, 3$$

$$a(t) = \theta_a \cos\left(\Omega t + \frac{2\pi}{3}(k-1)\right)$$

$$b(t) = \theta_b \sin\left(\Omega t + \frac{2\pi}{3}(k-1)\right)$$

The Coleman transformation thus takes as input a first signal and a second signal, in the form of a tilt moment modulation signal and a yaw moment modulation signal.

FIG. 3 schematically illustrates an embodiment of a pitch actuation unit (PAU) which based on an m-blade coordinate transformation (T) in the form of a Coleman transformation determines pitch modification signals which when applied by the pitch actuator generates pitch actuation signals that will reduce the tower vibrations in question. In the example, either lateral tower vibrations or torsional tower vibrations.

FIG. 3 illustrates an embodiment where an input signal in the form of a gain adjusted velocity signal is used as input, i.e. $\theta_a$ or $\theta_b$ is set to be proportional to the velocity. If the pitch actuation unit is to reduce lateral tower vibrations, the input signal may be the velocity signal in lateral tower motional direction, whereas if the pitch actuation unit is to reduce torsional tower vibrations, the input signal may be the velocity signal in the torsional motional direction.

In an embodiment, the input signal is based on a measured accelerometer signal which is transformed into a velocity signal of the nacelle motion. The signal may be a motional signal obtained by an accelerometer positioned so that the acceleration of the movement in the relevant direction of the nacelle is measured, cf. ref. 8 on FIG. 1. The accelerometer signal is in a prior step (not shown on FIG. 3) integrated in order to be transformed into a velocity signal. Alternatively or additionally, the motional signal may be pre-processed to a certain extend. Such pre-processing may be the application of an anti-aliasing filter to remove any high frequency content which is not needed for the further use. Other filters, including other band-pass filter may be applied during the pre-processing.

In FIG. 3, the m-blade coordinate transformation (T) take as inputs a first signal and a second signal. The first signal is the gain adjusted velocity signal, whereas the second signal is determined by filtering the first signal with a signal filter (QPS) with a quadrature phase shift filter phase response. A quadrature phase shift filter shifts the phase with 90° and the second signal is thus determined as the first signal with a 90 degrees phase shift.

In an embodiment, the 90 degrees phase shift is obtained by applying a filter in the form of a leaky integrator to the first signal. The leaky integrators can be implemented as 1st order low pass filters tuned with a break frequency below the rotor frequency.

By determining the second signal as the first signal with a 90 degrees phase shift, the pitch modification signal is obtained as:

$$\theta_k = A\sin\left((\omega t \mp \Omega t) + \phi \pm \frac{2\pi}{3}(k-1)\right)$$

where the sign (±) depend upon whether or not the second signal is shifted +90° or −90°.

Thus, the signal filter (QPS) may be implemented for selecting either a positive filter phase response or a negative filter phase response.

FIG. 3 illustrates an embodiment of the pitch actuation unit (PAU) where the first signal and second signal is modified by a common gain, referred to simply as 'gain'.

Figure 4:
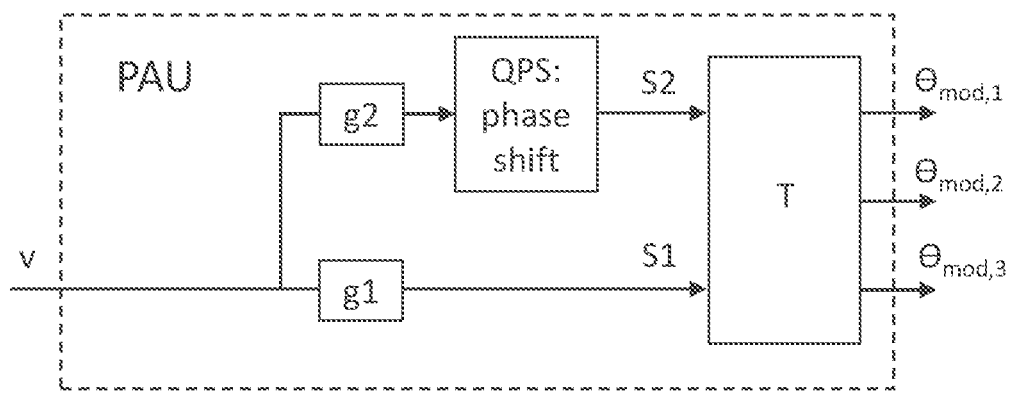

FIG. 4 illustrates an embodiment of the pitch actuation unit (PAU) where the first signal is modified by a first gain, g1, and the second signal is modified by a second gain, g2. The first and second gains being different.

Figure 5:
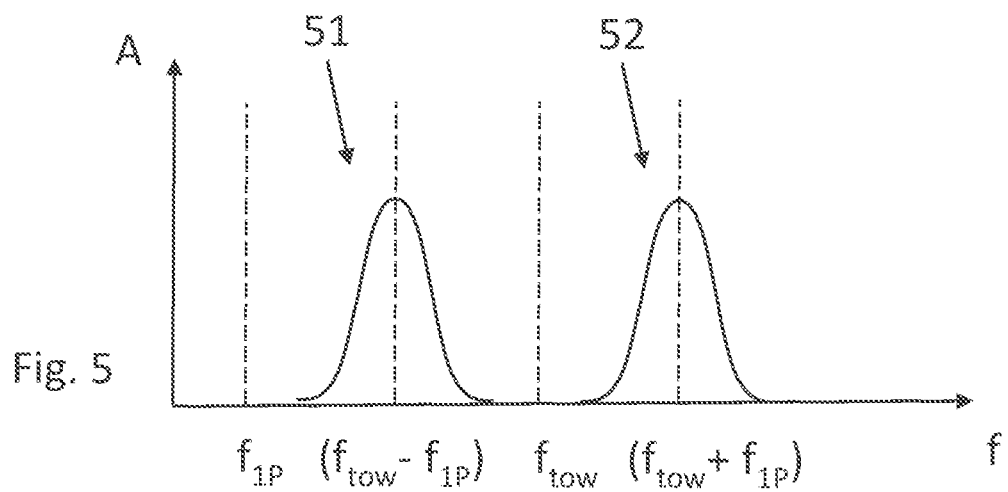
FIGS. 5 to 7 illustrate examples of frequency spectra of a pitch actuation signals.

FIG. 5 illustrates an example of a frequency (f) spectrum (i.e., amplitude A as a function of frequency f) of a pitch actuation signal where the first signal is set as a gain adjusted tower velocity signal in the lateral direction, and where the second signal is set to be zero. This is a normal situation of the prior art. The figure shows the tower frequency ($f_{tow}$) of the targeted vibrational mode and the rotor frequency ($f_{1P}$). The resulting frequency spectrum of the pitch actuation signal comprises two periodic components, a first periodic component 51 with a first frequency being the frequency difference between the tower frequency ($f_{tow}$) and the rotor frequency ($f_{1P}$), and a second periodic component 52 with a second frequency being frequency sum of the tower frequency ($f_{tow}$) and the rotor frequency ($f_{1P}$). The figure shows that in order to reduce the tower vibrating at a given frequency, known application of the Coleman transform results in a pitching activity in two frequency areas, one on each side of the vibrational frequency. The tower may vibrate at a number of frequencies, and the damping may be targeted at the dominant vibrational mode in the frequency spectrum. The tower frequency may in embodiments be the first tower natural frequency, also sometimes referred to as the first Eigen mode.

Figure 6:
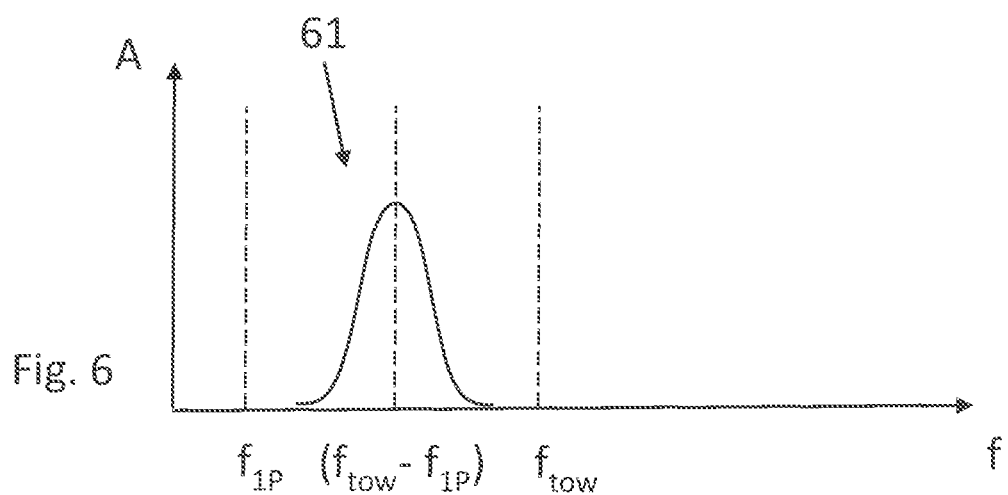

FIG. 6 illustrates the resulting frequency spectrum where the second signal is determined as the first signal with a +90 degrees phase shift. As a result of this, the resulting frequency spectrum of the pitch actuating signal only comprises the low frequency ($f_{tow}-f_{1P}$) component 61. This is advantageous, as the resulting pitch activity is thereby reduced leading to less fatigue exposure of the pitch bearings.

In another embodiment, the second signal may be set as the first signal with a −90 degrees phase shift, in which case the resulting frequency spectrum of the pitch actuation signal would only comprise the high frequency ($f_{tow}+f_{1P}$) component. While the pitching activity in this case would be higher, it may still be advantageous, as the resulting pitch activity is nevertheless reduced as compared to the situation where the pitch actuation signal comprises periodic components as shown in FIG. 5. Moreover it may also be advantageous to only actuate the pitching at the sum frequencies in situations where the difference frequency couples to exciting modes in the turbine. In this way tower vibration reduction may be obtained by use of pitching at frequencies which does not, or only to a lesser degree, exciting specific (not desired) vibrational modes of the turbine.

In the embodiment illustrated in FIG. 3, the first signal and second signal are modified by a common gain. However, in other embodiments, the first signal may be modified by a first gain, g1, and the second signal being modified by a second different gain, g2. This is shown in FIG. 4.

Figure 7:
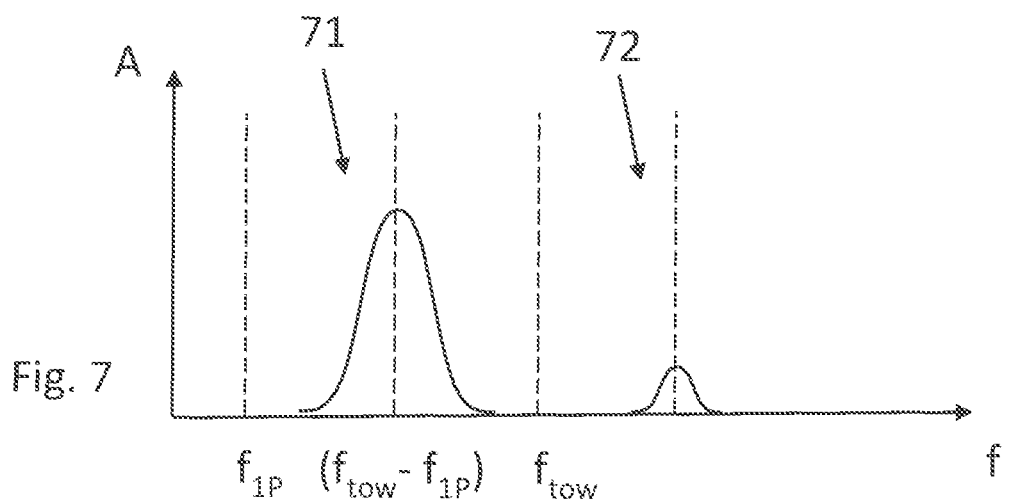

By applying two different gains, the resulting frequency spectrum may be tuned to a specific mix of actuation frequencies. An example is shown in FIG. 7 where the primary actuation frequency area is the area of the difference frequency 71, however, also a smaller content is present at the sum frequencies 72. In this way, the pitching activity and resulting vibrational reduction effect may be tuned in view of a specific turbine structure.

Figure 8:
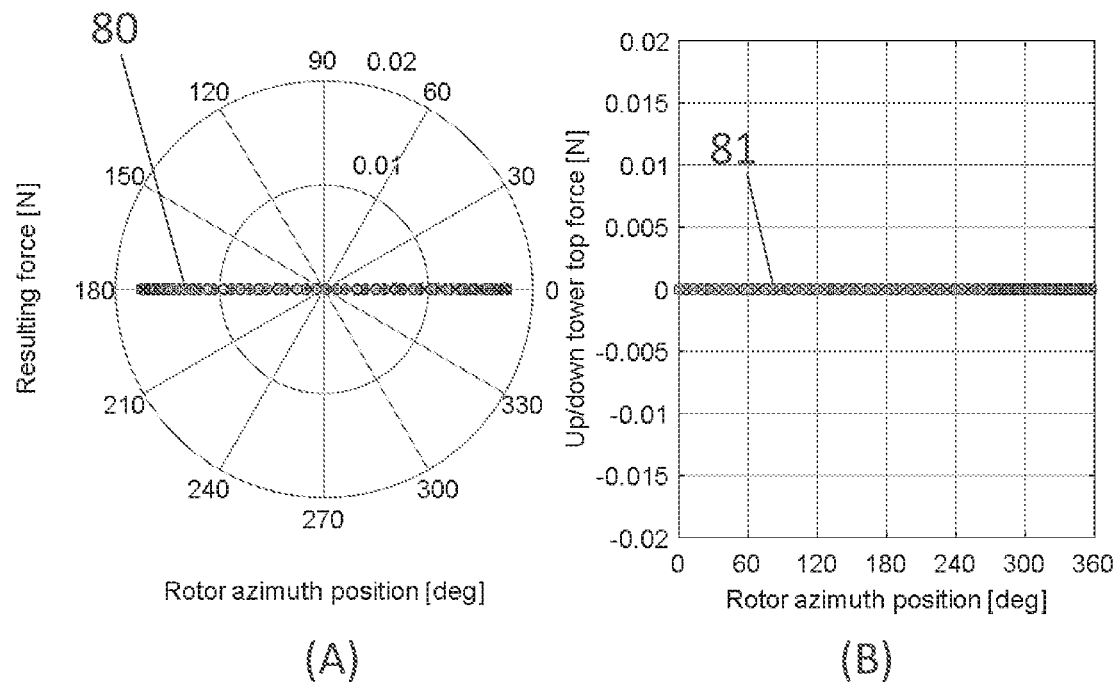
FIGS. 8 and 9 show examples of the resulting force generated by the pitching activity according to a signal corresponding to the pitch actuation signal of FIGS. 5 to 7.

FIG. 8 shows an example of the resulting force 80 generated by the pitching activity according to a signal corresponding to the pitch actuation signal of FIG. 5. The resulting force is the force applied on the tower from the blades due to the pitching.

FIG. 8A shows a polar plot of the direction of the resulting forcing 80. The angles 90° and 270° correspond to up and down, respectively, and the angles 0° and 180° correspond to the two directions away from the wind turbine in the horizontal plane orthogonal to the rotor axis.

FIG. 8B is a plot showing the up/down tower top force 81, i.e., the force in the vertical direction orthogonal to the rotor axis applied on the tower from the blades due to pitching according to the signal corresponding to the signal of FIG. 5.

More particularly, the polar plot of FIG. 8A shows that a horizontal force is applied on the tower from the blades due to pitching according to the signal of FIG. 5. The force is applied in opposite phase with the direction of the movement, corresponding to viscous damping. By determining the second signal as the first signal with a 90 degrees phase shift, in correspondence with the pitch actuation signal is as shown in FIGS. 6 and 7, the resulting force is changed.

Figure 9:
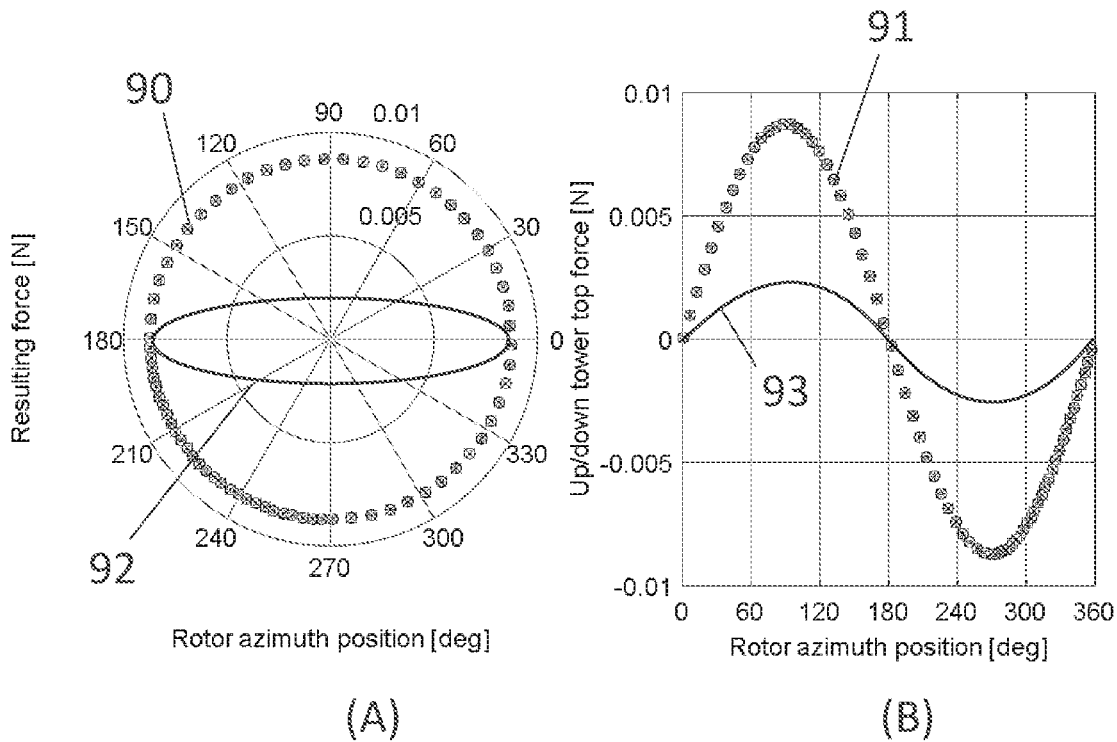

FIG. 9 illustrates a plot similar to FIG. 8, but based on a pitch actuation signal with a tower damping pitch control signal corresponding to the signal as depicted in FIGS. 6 and 7. The plots shown as plots 90 and 91 in FIG. 9 is based on a pitch actuation signal which is only comprising one periodic component (FIG. 6).

FIG. 9 shows that in this situation, the force applied on the tower from the blades due to pitching activity is not only horizontal, but also comprises a vertical component. The resulting force vector draws a circle (over time). Importantly, the horizontal component is working in the right direction, and the vertical force component is carried by the tower and/or gravity. As a result, the tower vibration in the lateral direction is damped.

By introducing a difference between the gains applied to the first and the second signals (FIGS. 4 and 7), i.e. by applying a first and a different second gain, a resulting force vector is obtained which is in-between the two situations of a horizontal force vector of FIG. 8 and a rotating force vector of FIG. 9. The resulting force vector in such a situation would still be rotating, but not along a circular path, but along an oval path as shown in FIGS. 9A and 9B by the plots 92, 93. The shape of the resulting force vector may be tuned by proper adjustment of the two gains g1, g2.

It may also be that the filter is not able to completely shift the phase of the second signal to 90°, or that some frequency shifting is introduced by the filter. In this situation, the second filter component would not be completely cancelled out. The effect is the same as applying two different gains to the two signals.

In an embodiment an adjustment gain with a gain scheduling term may be applied, the gain scheduling term being dependent upon an operational point of the wind turbine. Such adjustment gain may be applied at any suitable location in the signal path or incorporated in either the common gain or the first and second gains. By applying an adjustment gain being further gain scheduled by a gain scheduling term, the total gain may be adjusted for such operational parameters as wind speed, amplitude of acceleration, rotor speed, or other parameters defining an operational point. For example, the gain adjustment term may be multiplied by a factor which increases with increasing acceleration in the lateral direction.

Example embodiments of the invention have been described for the purposes of illustration only, and not to limit the scope of the invention as defined in the accompanying claims.

The invention claimed is:

1. A rotor control system for actuating pitch of pitch adjustable rotor blades of a wind turbine comprising a tower, the rotor control system comprises a pitch actuating unit for determining a pitch modification signal to be applied to a pitch actuator for actuating the pitch of the pitch adjustable rotor blades based on a pitch actuation signal;
   wherein the pitch modification signal is based on an m-blade coordinate transformation, the m-blade coordinate transformation taking as input a first signal and a second signal; and
   wherein the second signal is determined by filtering the first signal with a signal filter with a quadrature phase shift filter phase response.

2. The rotor control system according to claim 1, wherein the pitch actuation signal is determined for each pitch adjustable rotor blade based on the pitch modification signal for each rotor blade.

3. The rotor control system according to claim 1, wherein the pitch modification signal is a damping signal for damping a vibration of an element of the wind turbine.

4. The rotor control system according to claim 1, wherein the signal filter is a leaky integrator.

5. The rotor control system according to claim 1, wherein the first signal is a tower motion signal reflecting a tower motion in a selected motional mode, or the first signal is a signal reflecting motion of a turbine element which is fixed to the tower or in a fixed relationship with the tower.

6. The rotor control system according to claim 1, wherein the signal filter is selectable for either a positive filter phase response or a negative filter phase response.

7. The rotor control system according to claim 1, wherein the first signal and second signal is modified by a common gain.

8. The rotor control system according to claim 1, wherein the first signal is modified by a first gain and the second signal is modified by a second gain.

9. The rotor control system according to claim 1 further comprising:
   determine a collective pitch reference for the pitch-adjustable rotor blades, the collective pitch reference being determined based on a rotor speed,
   apply a resulting pitch modification signal to the pitch-adjustable rotor blades, the resulting pitch modification signal being applied to the pitch-adjustable rotor blades individually, and for each individual blade being based on a combined signal of the collective pitch reference and the individual resulting pitch modification signals.

10. The rotor control system according to claim 9, wherein the collective pitch reference is determined by feedback control based on minimizing a speed error between an actual rotor speed and a reference rotor speed or wherein the collective pitch reference is determined by a model predictive controller being based on minimizing a cost function.

11. The rotor control system according to claim 1, wherein the m-blade coordinate transformation is based on a Coleman transformation.

12. The rotor control system according to claim 1 further comprising an adjustment gain with a gain scheduling term, the gain scheduling term being dependent upon an operational point of the wind turbine.

13. A method of actuating pitch of pitch adjustable rotor blades of a wind turbine, the method comprises:
   determining a pitch modification signal based on an m-blade coordinate transformation, the m-blade coordinate transformation taking as input a first signal and a second signal;
   wherein the second signal is determined by filtering the first signal with a signal filter with a quadrature phase shift filter phase response; and
   applying the pitch modification signal to a pitch actuator of the pitch adjustable rotor blades.

14. A wind turbine, comprising:
   a tower;
   a nacelle disposed on the tower;
   a rotor extending from the nacelle and having a plurality of pitch adjustable rotor blades disposed on a distal end thereof; and
   a rotor control system for actuating pitch of the plurality of blades; the rotor control system comprises a pitch actuating unit for determining a pitch modification signal to be applied to a pitch actuator for actuating the pitch of the pitch adjustable rotor blades based on a pitch actuation signal;
   wherein the pitch modification signal is based on an m-blade coordinate transformation, the m-blade coordinate transformation taking as input a first signal and a second signal; and
   wherein the second signal is determined by filtering the first signal with a signal filter with a quadrature phase shift filter phase response.

15. The wind turbine according to claim 14, wherein the pitch actuation signal is determined for each pitch adjustable rotor blade based on the pitch modification signal for each pitch adjustable rotor blade.

16. The wind turbine according to claim 14, wherein the pitch modification signal is a damping signal for damping a vibration of an element of the wind turbine.

17. The wind turbine according to claim 14, wherein the first signal is a tower motion signal reflecting a tower motion in a selected motional mode, or the first signal is a signal reflecting motion of a turbine element which is fixed to the tower or in a fixed relationship with the tower.

18. A computer program product, comprising software code which, when executed by a data processing system, performs an operation for actuating pitch of pitch adjustable rotor blades of a wind turbine; the operation, comprising:
  determining a pitch modification signal based on an m-blade coordinate transformation, the m-blade coordinate transformation taking as input a first signal and a second signal; wherein the second signal is determined by filtering the first signal with a signal filter with a quadrature phase shift filter phase response; and
  applying the pitch modification signal to a pitch actuator of the pitch adjustable rotor blades.

* * * * *